(12) United States Patent
Kruh et al.

(10) Patent No.: US 12,101,109 B2
(45) Date of Patent: Sep. 24, 2024

(54) INTELLIGENT THERMAL AND POWER MANAGEMENT IN A WIRELESS COMMUNICATIONS DEVICE IN A WIRELESS COMMUNICATIONS SYSTEM (WCS)

(71) Applicant: Corning Research & Development Corporation, Corning, NY (US)

(72) Inventors: Lior Michael Kruh, Sunnyvale, CA (US); Shirish Nagaraj, Pleasanton, CA (US); Deepak Pengoria, Milpitas, CA (US); Hsien Li Woo, San Diego, CA (US)

(73) Assignee: Corning Research & Development Corporation, Corning, NY (US)

( * ) Notice: Subject to any disclaimer, the term of this patent is extended or adjusted under 35 U.S.C. 154(b) by 196 days.

(21) Appl. No.: 17/827,419

(22) Filed: May 27, 2022

(65) Prior Publication Data
US 2022/0385312 A1    Dec. 1, 2022

Related U.S. Application Data

(60) Provisional application No. 63/193,633, filed on May 27, 2021.

(51) Int. Cl.
*H04B 1/036* (2006.01)
*H04B 10/2575* (2013.01)
*H04W 52/02* (2009.01)

(52) U.S. Cl.
CPC ....... *H04B 1/036* (2013.01); *H04B 10/25753* (2013.01); *H04W 52/0251* (2013.01)

(58) Field of Classification Search
CPC ............. H04B 1/036; H04B 10/25753; H04W 52/0251

(Continued)

(56) References Cited

U.S. PATENT DOCUMENTS 8,121,235 B1    2/2012  Sun et al.
9,964,969 B1 *  5/2018  Higgs ................... H04M 1/724
(Continued)

FOREIGN PATENT DOCUMENTS

CA       2623255 A1 *  4/2007  ........... G01N 27/048
CA       2631170 A1 *  6/2007  ......... G01N 33/0075
WO    2020/190089 A1     9/2020

OTHER PUBLICATIONS

A. M. Geoffrion, "Proper Efficiency and the Theory of Vector Maximization," Journal of Mathematical Analysis and Applications, vol. 22, 1968, pp. 618-630.

(Continued)

*Primary Examiner* — Abbas H Alagheband
(74) *Attorney, Agent, or Firm* — William D. Doyle

(57) ABSTRACT

Intelligent thermal and power management in a wireless communications device in a wireless communications system (WCS) is disclosed. In a non-limiting example, the wireless communications device can be a base station (e.g., eNB) in the WCS. The wireless communications device includes a number of sensor circuits each configured to perform a sensory measurement (e.g., temperature measurement) in a specific circuit or at a specific location of the wireless communications device. A control circuit is provided in the wireless communications device support intelligent thermal and power management in the wireless communications device. Specifically, the control circuit determines that the sensory measurement is above an abnormal threshold(s) and performs one or more corrective actions accordingly to reduce the sensory measurement to a desirable threshold. By employing intelligent thermal and power management in the wireless communications device, it is possible to improve performance and reduce size of the wireless communications device.

18 Claims, 13 Drawing Sheets

(58) Field of Classification Search
USPC .......................................................... 398/115
See application file for complete search history.

(56) References Cited

U.S. PATENT DOCUMENTS

| | | | | |
|---|---|---|---|---|
| 11,656,664 | B2* | 5/2023 | Cili | ................. G06F 1/206 455/572 |
| 11,784,693 | B1 | 10/2023 | Imanilov et al. | |
| 2008/0081669 | A1 | 4/2008 | Kwon et al. | |
| 2012/0075992 | A1* | 3/2012 | Shahidi | ................. G06F 1/206 370/252 |
| 2012/0100895 | A1* | 4/2012 | Priyantha | ......... H04W 52/0293 455/574 |
| 2014/0199952 | A1* | 7/2014 | Sandhu | ................. H04B 17/13 455/91 |
| 2017/0366242 | A1 | 12/2017 | Lee et al. | |
| 2019/0173537 | A1 | 6/2019 | Cai et al. | |
| 2020/0358498 | A1 | 11/2020 | Mo et al. | |
| 2021/0314048 | A1* | 10/2021 | Nagaraj | ................. H04W 80/06 |
| 2021/0382534 | A1* | 12/2021 | Cili | ................. G06F 1/206 |
| 2022/0149907 | A1 | 5/2022 | Goransson | |
| 2022/0155439 | A1 | 5/2022 | Rindal et al. | |
| 2022/0159480 | A1 | 5/2022 | Lu et al. | |
| 2022/0173783 | A1 | 6/2022 | Dash et al. | |
| 2022/0191855 | A1* | 6/2022 | Akkarakaran | ........ H04L 5/0025 |
| 2022/0201389 | A1 | 6/2022 | Hassani et al. | |
| 2022/0201675 | A1 | 6/2022 | Akkarakaran et al. | |

OTHER PUBLICATIONS

D. Bertsimas, V. F. Farias and N. Trichakis, "The Price of Fairness," Operations Research Center, Massachusetts Institute of Technology, vol. 59, No. 1, pp. 17-31, 2011.

Imanilov; "Beamforming Synthesis for Initial Access Fairness in Wireless Networks"; IEEE; 2022 pp. 46-48.

W. Ogryczak, M. Pioro and A. Tomaszewski, "Telecommunications network design and max-min optimization problem," Journal of Telecommunications and Information Technology, pp. 99-124, 2004.

* cited by examiner

| DL/UL CONFIGURATION | DL-TO-UL SWITCH-POINT PERIODICITY | SF NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 4.2-1 OF 3GPP TS 36.211 V13.0.0

FIG. 2B
PRIOR ART

CONFIGURATION TABLE (440)

| 600<br>SENSOR ID & LOCATION | 602<br>ABNORMAL TEMPERATURE THRESHOLD (TH$_H$) | 604<br>TOLERABLE TEMPERATURE THRESHOLD (TH$_L$) | 606<br>SEVERITY LEVEL (SL) | 608<br>CORRECTIVE ACTION |
|---|---|---|---|---|
| SENSOR CIRCUIT 402(3) @ CPU (418) | 70°C | 60°C | MINOR | REDUCE THROUGHPUT |
| | 80°C | 70°C | MAJOR | REDUCE RADIO RESOURCE ALLOCATION |
| | 90°C | 80°C | CRITICAL | REDUCE NUMBER OF ANTENNA ELEMENTS |
| | 100°C | 90°C | CATASTROPHIC | REBOOT/SHUTDOWN |
| SENSOR CIRCUIT 402(5) @ PA (428) | 80°C | 70°C | MINOR | REDUCE TX POWER |
| | 90°C | 80°C | MAJOR | REDUCE NUMBER OF ANTENNA ELEMENTS |
| | 100°C | 90°C | CRITICAL | FURTHER REDUCE NUMBER OF ANTENNA ELEMENTS |
| | 110°C | 100°C | CATASTROPHIC | REBOOT/SHUTDOWN |
| . . . | . . . | . . . | . . . | . . . |

FIG. 6

INTELLIGENT THERMAL AND POWER MANAGEMENT IN A WIRELESS COMMUNICATIONS DEVICE IN A WIRELESS COMMUNICATIONS SYSTEM (WCS)

CROSS-REFERENCE TO RELATED APPLICATIONS

This application claims the benefit of priority under 35 U.S.C. § 119 of U.S. Provisional Application Ser. No. 63/193,633, filed May 27, 2021, the content of which is relied upon and incorporated herein by reference in its entirety.

BACKGROUND

The disclosure relates generally to thermal and power management in a wireless communications device, such as a fifth-generation (5G) or a 5G new-radio (5G-NR) base station (eNB), in a wireless communications system (WCS), such as a 5G or a 5G-NR system and/or a distribute communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming (radio frequency (RF) antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective downlink communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the downlink communications signals 110(1)-110(N) of the multiple service providers 104(1)-104(N) to remote units. The remote units can each include an antenna array that includes tens or even hundreds of antennas for concurrently radiating the downlink communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the downlink communications signals 110(1)-110(N) to subscribers based on a massive multiple-input multiple-output (M-MIMO) scheme.

The WCS 100 may be configured to operate as a 5G or a 5G-NR communications system. In this regard, the radio node 102 can function as a 5G or 5G-NR base station (a.k.a. enhanced Node B or eNB). The radio node 102 is typically deployed in an indoor environment to communicate the downlink communications signals 110(1)-110(N) to subscribers located in a designated coverage area (e.g., small cell). The radio node 102 often employs a variety of active circuits, such as transceivers, power amplifiers, and antennas, for communicating the downlink communications signals 110(1)-110(N) with desirable coverage range and throughput. Understandably, these active circuits can each generate a certain amount of heat, such as junction heat generated by various types of transistors in the active circuits. As such, each active circuit typically relies on internal and/or external heat sink for heat dissipation. However, the radio node 102 may be deployed in an environment with an elevated temperature, which not only reduces heat dissipating effectiveness of the heat sink, but also increases case temperature (e.g., ambient temperature inside and/or on surface of a housing) of the radio node 102. As such, it is desirable to employ intelligent thermal and power control mechanisms to help maintain operating efficiency and longevity of the radio node 102.

No admission is made that any reference cited herein constitutes prior art. Applicant expressly reserves the right to challenge the accuracy and pertinency of any cited documents.

SUMMARY

Embodiments disclosed herein include intelligent thermal and power management in a wireless communications device in a wireless communications system (WCS). In a non-limiting example, the wireless communications device can be a base station (e.g., eNB) in the WCS. The wireless communications device includes a number of sensor circuits each configured to perform a sensory measurement (e.g., temperature measurement) in a specific circuit or at a specific location of the wireless communications device. A control circuit is provided in the wireless communications device support intelligent thermal and power management in the wireless communications device. Specifically, the control circuit determines that the sensory measurement is above an abnormal threshold(s) and performs one or more corrective actions accordingly to reduce the sensory measurement to a desirable threshold. By employing intelligent thermal and power management in the wireless communications device, it is possible to improve performance and reduce size of the wireless communications device.

One exemplary embodiment of the disclosure relates to a wireless communications device. The wireless communications device includes a plurality of sensor circuits each configured to generate a sensor reading signal that indicates a sensory measurement performed by the sensor circuit. The wireless communications device also includes a control circuit. The control circuit is configured to receive the sensor reading signal generated from a respective one of the plurality of sensor circuits. The control circuit is also configured to determine if the sensory measurement indicated by the sensor reading signal is above at least one of a plurality of abnormal thresholds corresponding to the respective one of the plurality of sensor circuits. In response to the sensory measurement indicated by the sensor reading signal being above the at least one of the plurality of abnormal thresholds, the control circuit is also configured to perform one or more of a plurality of corrective actions predetermined for the respective one of the plurality of sensor circuits to reduce the sensory measurement to a desired one of a plurality of tolerable thresholds corresponding to the respective one of the plurality of sensor circuits.

An additional exemplary embodiment of the disclosure relates to a method for supporting intelligent thermal and power management in a wireless communications device in a WCS. The method includes receiving a sensor reading signal generated from a respective one of a plurality of sensor circuits, wherein the sensor reading signal indicates a sensory measurement performed by the respective one of the plurality of sensor circuits. The method also includes determining if the sensory measurement indicated by the sensor reading signal is above at least one of a plurality of abnormal thresholds corresponding to the respective one of the plurality of sensor circuits. The method also includes, in response to the sensory measurement indicated by the sensor reading signal being above the at least one of the plurality of abnormal thresholds, performing one or more of a plurality of corrective actions predetermined for the respective one of the plurality of sensor circuits to reduce the sensory measurement to a desired one of a plurality of tolerable thresholds corresponding to the respective one of the plurality of sensor circuits.

An additional exemplary embodiment of the disclosure relates to a WCS. The WCS includes a wireless communications device coupled to a centralized services node. The wireless communications device includes a plurality of sensor circuits each configured to generate a sensor reading signal that indicates a sensory measurement performed by the sensor circuit. The wireless communications device also includes a control circuit. The control circuit is configured to receive the sensor reading signal generated from a respective one of the plurality of sensor circuits. The control circuit is also configured to determine if the sensory measurement indicated by the sensor reading signal is above at least one of a plurality of abnormal thresholds corresponding to the respective one of the plurality of sensor circuits. In response to the sensory measurement indicated by the sensor reading signal being above the at least one of the plurality of abnormal thresholds, the control circuit is also configured to perform one or more of a plurality of corrective actions predetermined for the respective one of the plurality of sensor circuits to reduce the sensory measurement to a desired one of a plurality of tolerable thresholds corresponding to the respective one of the plurality of sensor circuits.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2B provides an exemplary illustration of time-division duplex (TDD) downlink/uplink configurations for frame structure type 2 (FS2) as defined by third-generation partnership project (3GPP) technical specification (TS) 36.211 V13.0.0.0;

FIG. 6 is an exemplary configuration table that may be employed by a control circuit in the wireless communications device in FIG. 4 to help enable intelligent thermal and power management;

DETAILED DESCRIPTION

Embodiments disclosed herein include intelligent thermal and power management in a wireless communications device in a wireless communications system (WCS). In a non-limiting example, the wireless communications device can be a base station (e.g., eNB) in the WCS. The wireless communications device includes a number of sensor circuits each configured to perform a sensory measurement (e.g., temperature measurement) in a specific circuit or at a specific location of the wireless communications device. A control circuit is provided in the wireless communications device support intelligent thermal and power management in the wireless communications device. Specifically, the control circuit determines that the sensory measurement is above an abnormal threshold(s) and performs one or more corrective actions accordingly to reduce the sensory measurement to a desirable threshold. By employing intelligent thermal and power management in the wireless communications device, it is possible to improve performance and reduce size of the wireless communications device.

Figure 1:
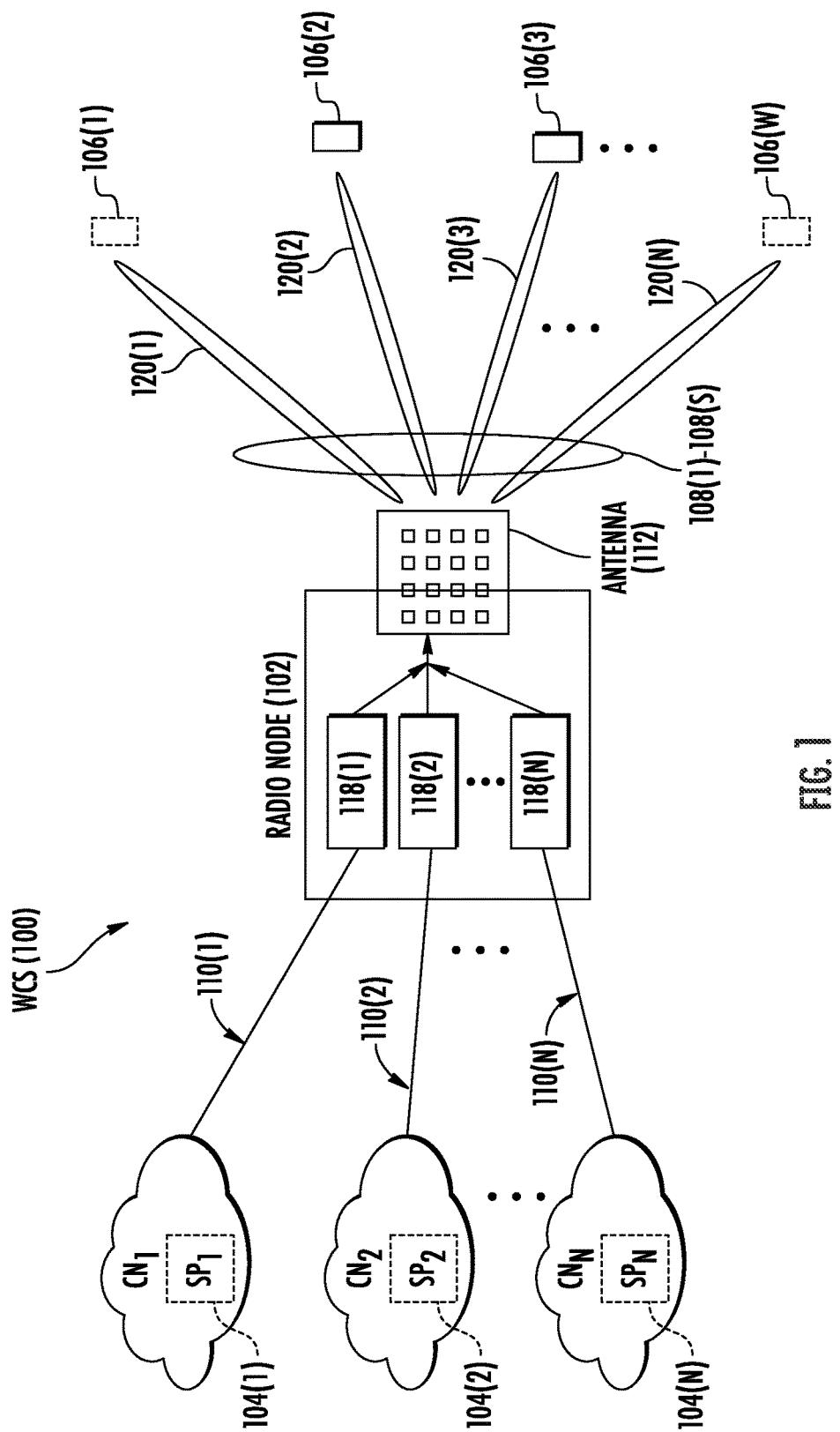
FIG. 1 is a schematic diagram of an exemplary wireless communications system (WCS), such as a distributed communications system (DCS), configured to distribute communications services to remote coverage areas.
Figure 2A:
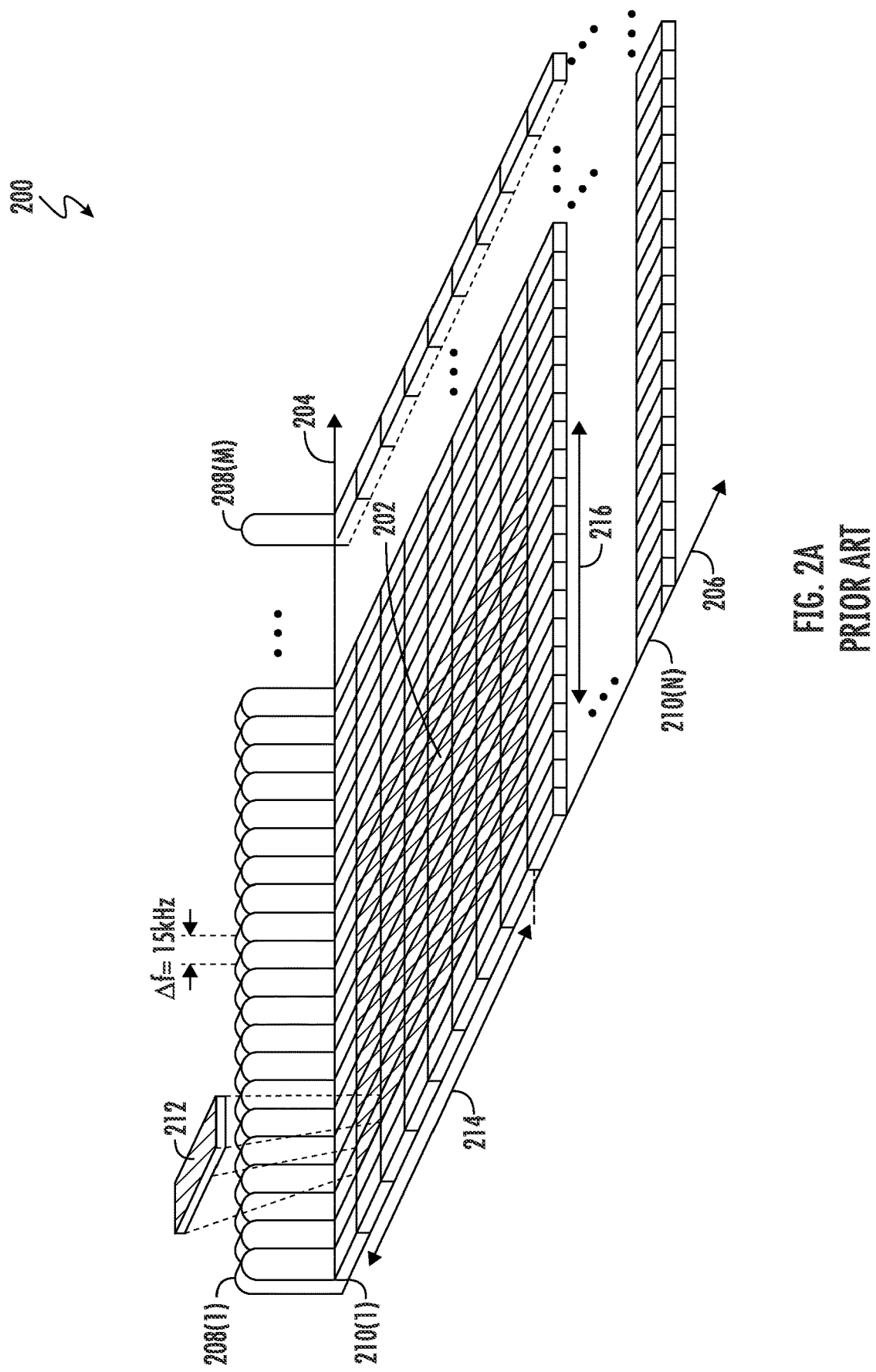
FIG. 2A is a schematic diagram of an exemplary physical resource allocation scheme based on an orthogonal frequency division multiplexing (OFDM) time-frequency grid 200 that includes at least one resource block (RB)
Figure 3:
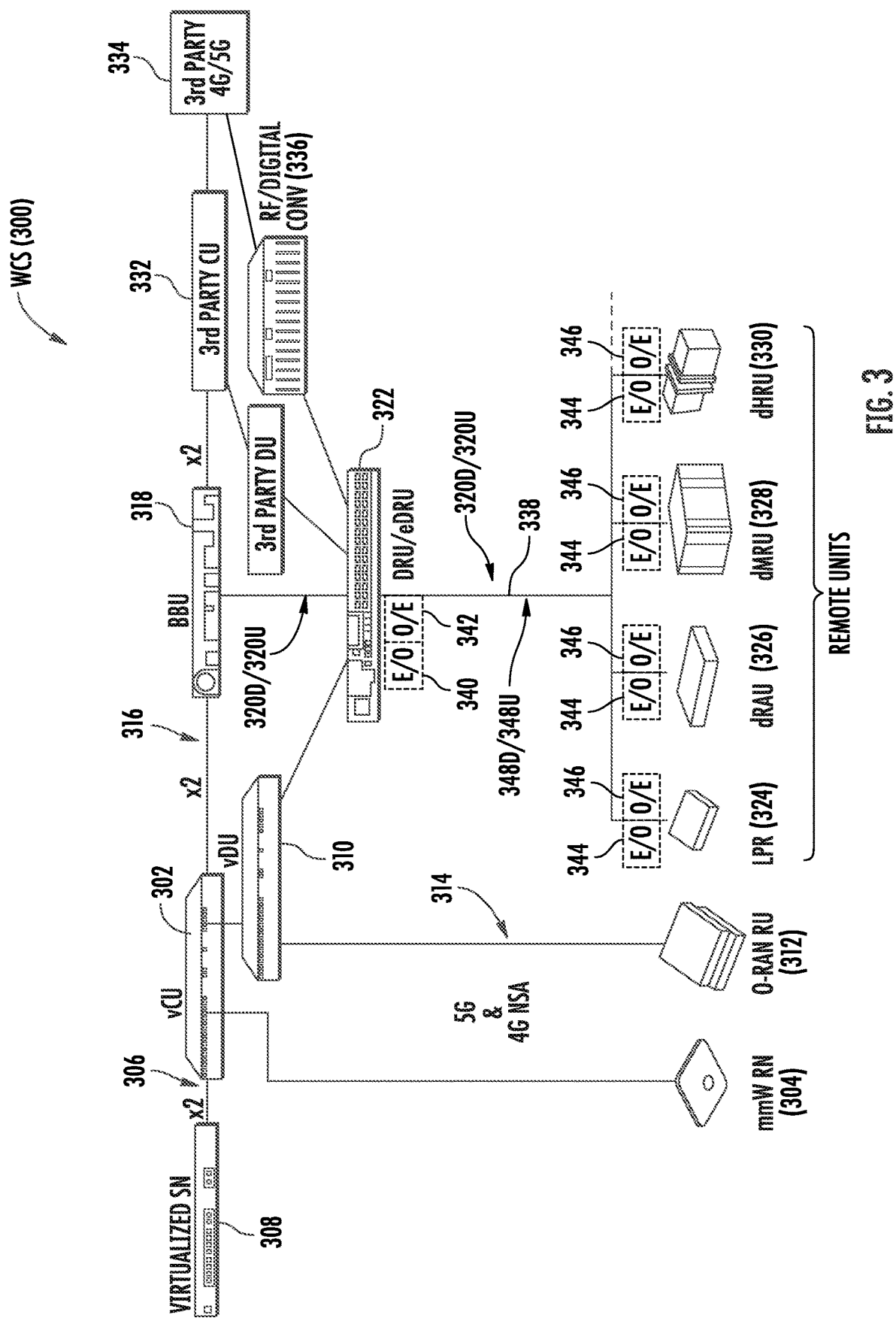
FIG. 3 is a schematic diagram of an exemplary WCS configured according to any of the embodiments disclosed herein to enable intelligent thermal and power management.

Before discussing supporting intelligent thermal and power management in a WCS according to the present disclosure, starting at FIG. 3, an overview of physical and logical radio resource allocations in a wireless communications network and a brief discussion of a time-division duplex (TDD) slot configuration scheme are first provided with reference to FIGS. 2A-2B.

In this regard, FIG. 2A is a schematic diagram of an exemplary physical resource allocation scheme based on an orthogonal frequency division multiplexing (OFDM) time-frequency grid 200 that includes at least one resource block (RB) 202. The OFDM time-frequency grid 200 includes a frequency-domain axis 204 and a time-domain axis 206. Along the frequency-domain axis 204, there are a number of subcarriers 208(1)-208(M). The subcarriers 208(1)-208(M) are orthogonally separated from each other by a frequency spacing $\Delta f$ (e.g., 15 KHz). Along the time-domain axis 206, there are a number of OFDM symbols 210(1)-210(N). Each intersection of the subcarriers 208(1)-208(M) and the OFDM symbols 210(1)-210(N) defines a resource element (RE) 212. The subcarriers 208(1)-208(M) along the frequency-domain axis 204 and the OFDM symbols 210(1)-210(N) along the time-domain axis 206 are collectively referred to as physical radio resources of the wireless communications network.

In one non-limiting example, the RB 202 includes twelve (12) consecutive subcarriers among the subcarriers 208(1)-208(M), and fourteen (14) consecutive OFDM symbols among the OFDM symbols 210(1)-210(N). In this regard, the RB 202 includes one hundred sixty-eight (168) of the REs 212 (12 subcarriers×14 OFDM symbols). The RB 202 has an RB duration 214, which equals one-half of a millisecond (0.5 ms), along the time-domain axis 206. The RB duration 214 is commonly referred to as a slot or a time slot. Accordingly, the RB 202 has a bandwidth 216, which equals 180 KHz (15 KHz/subcarrier×12 subcarriers), along the frequency-domain axis 204. In OFDM-based communication systems like fifth-generation new radio (5G-NR), the RB 202 is the minimum unit for allocating the physical radio resource for communicating a downlink communications signal and/or an uplink communications signal.

FIG. 2B provides an exemplary illustration of TDD downlink/uplink configurations for frame structure type 2 (FS2) as defined by 3GPP technical specification (TS) 36.211 V13.0.0.0. With FS 2 for TDD, each radio frame of length 10 ms consists of two half-frames of length 5 ms each. Each half-frame consists of five Subframes (SFs) of length 1 ms. Each SF is defined by two slots of length 0.5 ms each. Within each radio frame, a subset of SFs is reserved for uplink transmissions, and the remaining SFs are allocated for downlink transmissions, or for special SFs, where the switch between downlink and uplink occurs.

As shown in FIG. 2B, seven different downlink/uplink configurations are supported for FS 2. Here, "D" denotes a downlink SF, "U" denotes an uplink SF, and "S" represents a special SF. Configurations 0, 1, 2, and 6 have 5 ms downlink-to-uplink switch-point periodicity, with the special SF existing in both SF 1 and SF 6. Configurations 3, 4, and 5 have 10 ms downlink-to-uplink switch-point periodicity, with the special SF in SF 1 only.

A special SF is split into three parts, namely a downlink part (downlink part of a special subframe (DwPTS)), guard period (GP), and an uplink part of a special subframe (UpPTS). The DwPTS with a duration of more than three symbols can be treated as a normal downlink SF for data transmission.

FIG. 3 is a schematic diagram of an exemplary WCS 300 configured according to any of the embodiments disclosed herein to support intelligent thermal and power management. The WCS 300 supports both legacy 4G LTE, 4G/5G non-standalone (NSA), and 5G standalone communications systems. As shown in FIG. 3, a centralized services node 302 is provided that is configured to interface with a core network to exchange communications data and distribute the communications data as radio signals to remote units. In this example, the centralized services node 302 is configured to support distributed communications services to an mmWave radio node 304. Despite that only one of the mmWave radio node 304 is shown in FIG. 3, it should be appreciated that the WCS 300 can be configured to include additional number of the mmWave radio node 304, as needed. The functions of the centralized services node 302 can be virtualized through an x2 interface 306 to another services node 308. The centralized services node 302 can also include one or more internal radio nodes that are configured to be interfaced with a distribution node 310 to distribute communications signals for the radio nodes to an open random access network (O-RAN) remote unit 312 that is configured to be communicatively coupled through an O-RAN interface 314.

The centralized services node 302 can also be interfaced through an x2 interface 316 to a digital baseband unit (BBU) 318 that can provide a digital signal source to the centralized services node 302. The digital BBU 318 is configured to provide a signal source to the centralized services node 302 to provide downlink communications signals 320D to the O-RAN remote unit 312 as well as to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

Notably, the mmWave radio node 304 can include various active circuits (e.g., transceiver circuit, RF front-end circuit, antenna array, etc.) that require effective heat dissipation to maintain normal operation. In addition, the mmWave radio node 304 may be deployed in a harsh environment with elevated ambient temperature that can hinder the ability of the mmWave radio node 304 to maintain a normal operating temperature. Furthermore, the ongoing demand for further miniaturization of the mmWave radio node 304 makes it even more challenging to maintaining the normal operating temperature in the mmWave radio node 304. As such, it is desired to enable intelligent thermal and power management in the mmWave radio node 304 for improved performance and reduce size of the mmWave radio node 304.

Figure 4:
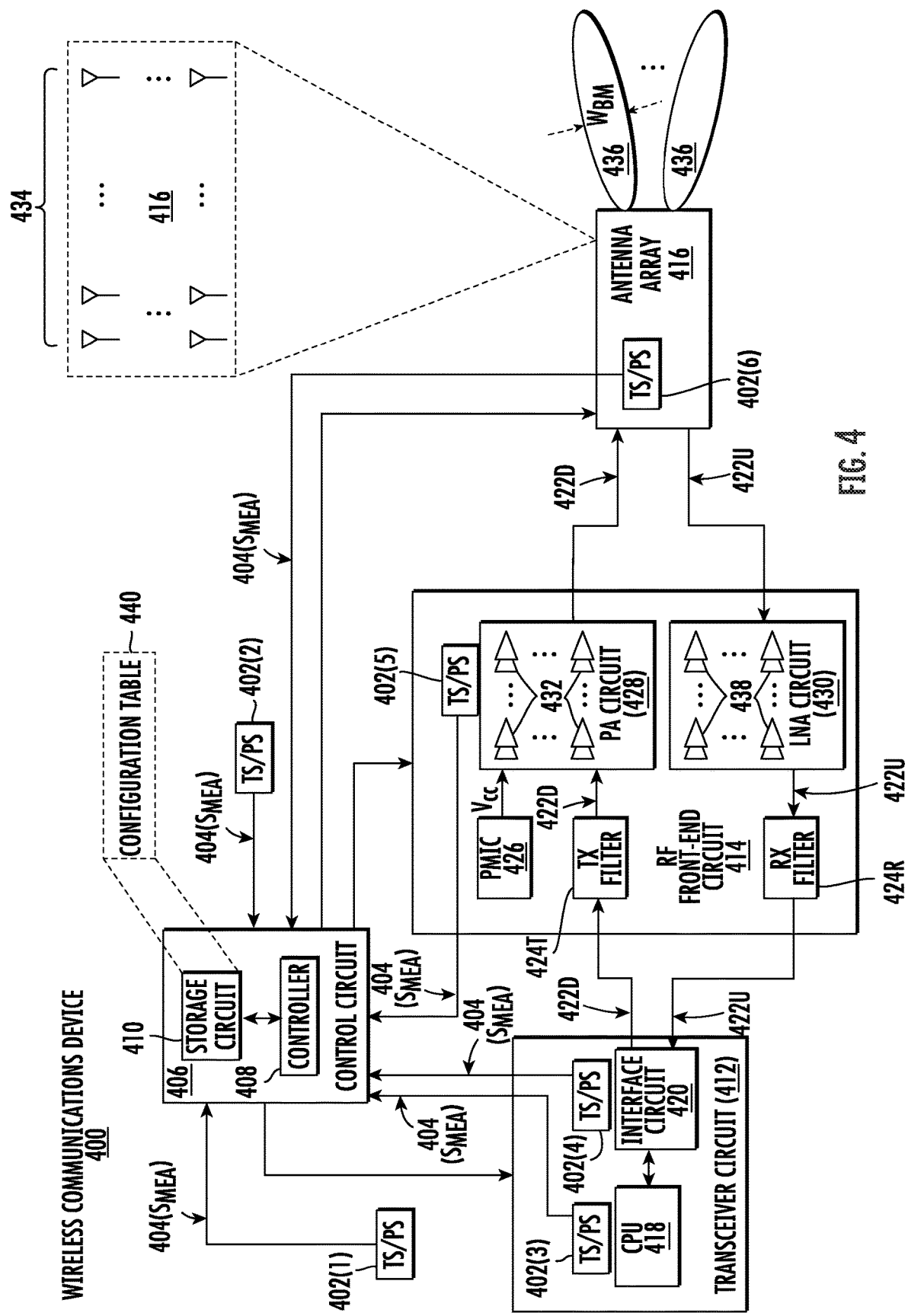
FIG. 4 is a schematic diagram of an exemplary wireless communications device configured to enable intelligent thermal and power management in the WCS of FIG. 3 according to embodiments disclosed in the present disclosure.

In this regard, FIG. 4 is a schematic diagram of an exemplary wireless communications device 400 configured to enable intelligent thermal and power management in the WCS 300 according to embodiments disclosed in the present disclosure. The wireless communications device 400 may be functionally equivalent to the mmWave radio node 304 in the WCS 300 of FIG. 3 but is not limited to communications in the mmWave spectrum.

The wireless communications device 400 includes a plurality of sensor circuits 402(1)-402(6) (denoted as "TS/PS" for "Temperature Sensor/Power Sensor") that a disposed in various locations of the wireless communications device 400. Notably, the sensor circuits 402(1)-402(6) as shown in FIG. 4 are merely non-limiting examples for the purpose of reference and should not be interpreted as being limiting in terms of number, and/or location. It should also be appreciated that each of the sensor circuits 402(1)-402(6) can include additional types of sensors (e.g., humidity sensor, pressure sensor, etc.) to perform additional sensory measurements besides temperature and/or power measurements. In examples disclosed herein, each of the sensor circuits 402(1)-402(6) is configured to generate a sensor reading signal 404 that indicates a sensory measurement ($S_{MEA}$) (e.g., temperature) performed by the sensor circuit 402(1)-402(6) at a respective location where the sensor circuit 402(1)-402(6) is disposed.

The wireless communications device 400 also includes a control circuit 406, which can be a field-programmable gate array (FPGA) that includes a controller 408 and a storage circuit 410 (e.g., memory, register, etc.). The control circuit 406 is configured to receive the sensor reading signal 404 from a respective one of the sensor circuits 402(1)-402(6) and determine that the sensory measurement $S_{MEA}$ indicated by the sensor reading signal 404 is above at least one of a plurality of abnormal thresholds $TH_H$ (as shown in FIG. 6) corresponding to the respective one of the sensor circuits 402(1)-402(6). Accordingly, the control circuit 406 can perform one or more of a plurality of corrective actions predetermined for the respective one of the sensor circuits 402(1)-402(6) to reduce the sensory measurement $S_{MEA}$ to a desired one of a plurality of tolerable thresholds $TH_L$ (as shown in FIG. 6) corresponding to the respective one of the sensor circuits 402(1)-402(6).

For example, the control circuit 406 may receive the sensor reading signal 404 from the sensor circuit 402(1) that indicates the sensory measurement $S_{MEA}$ performed by the sensor circuit 402(1) at a location where the sensor circuit 402(1) is disposed. Thereafter, the control circuit 406 can determine whether the sensory measurement $S_{MEA}$ is above any of the abnormal thresholds $TH_H$ corresponding to the sensor circuit 402(1). Accordingly, the control circuit 406 can perform the corrective actions corresponding to the sensor circuit 402(1) to reduce the sensory measurement $S_{MEA}$ to the desired tolerable threshold $TH_L$ that corresponds to the sensor circuit 402(1).

Notably, the control circuit 406 can receive concurrently multiple sensor reading signals 404 indicating multiple sensory measurements $S_{MEA}$ at multiple locations in the wireless communications device 400. In this regard, the control circuit 406 is able to concurrently determine whether any of the multiple sensory measurements $S_{MEA}$ is above any of the abnormal thresholds $TH_H$ and perform the corrective actions to reduce the sensory measurement $S_{MEA}$ to the desired one of the tolerable thresholds $TH_L$. By employing the sensor circuits 402(1)-402(6) to perform the sensory measurements $S_{MEA}$ at various locations in the wireless communications device 400, it is possible to enable intelligent thermal and power management in the wireless communications device 400 for improved performance and reduce size of the wireless communications device 400.

Figure 5:
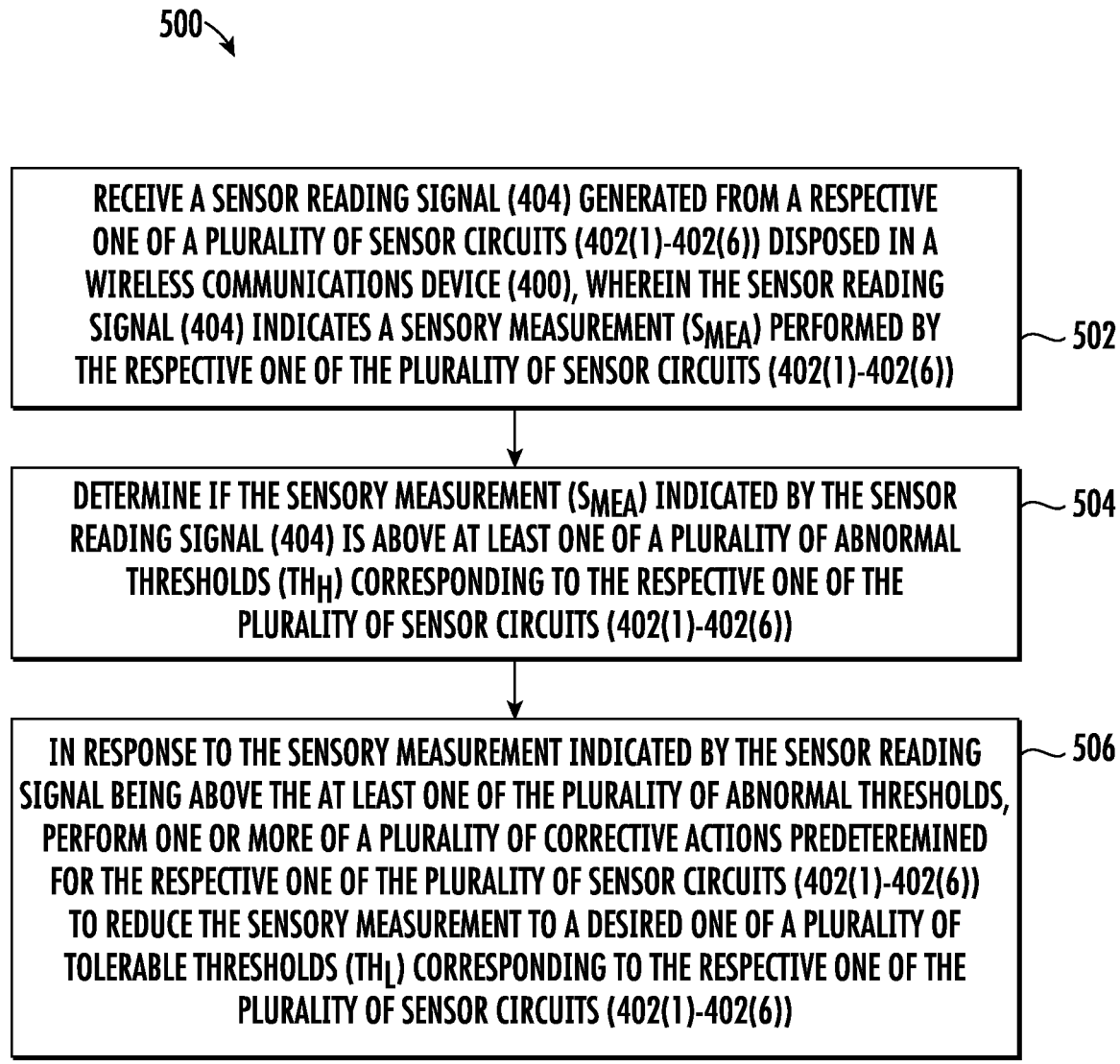
FIG. 5 is a flowchart of a process that may be employed by the wireless communications device in FIG. 4 to enable intelligent thermal and power management.

The wireless communications device 400 can be configured to support intelligent thermal and power management in accordance with a process. In this regard, FIG. 5 is a flowchart of a process 500 that may be employed by the wireless communications device 400 in FIG. 4 to enable intelligent thermal and power management.

According to the process 500, the control circuit 406 receives a sensor reading signal 404 from a respective one of the sensor circuits 402(1)-402(6) disposed in the wireless communications device 400 (block 502). The sensor reading signal 404 indicates a sensory measurement $S_{MEA}$ performed by the respective one of the sensor circuits 402(1)-402(6). Next, the control circuit 406 determines that the sensory measurement $S_{MEA}$ indicated by the sensor reading signal 404 is above at least one of a plurality of abnormal thresholds $TH_H$ corresponding to the respective one of the sensor circuits 402(1)-402(6) (block 504). Accordingly, the control circuit 406 can perform one or more of a plurality of corrective actions predetermined for the respective one of the plurality of sensor circuits 402(1)-402(6) to reduce the sensory measurement $S_{MEA}$ to a desired one of a plurality of tolerable thresholds $TH_L$ corresponding to the respective one of the plurality of sensor circuits 402(1)-402(6) (block 506).

With reference back to FIG. 4, in a non-limiting example, the wireless communications device 400 can include a transceiver circuit 412, a radio frequency (RF) front-end circuit 414, and an antenna array 416. The transceiver circuit 412 includes a central processing unit (CPU) 418, which can be a single-core or multi-core CPU, as an example. The transceiver circuit 412 also includes an interface circuit 420, which may include encoder/decoder, digital-to-analog converter (DAC), analog-to-digital converter (ADC), oscillator, and so on. The transceiver circuit 412 may be coupled to the centralized services node 302 in FIG. 3 and configured to communicate a downlink communications signal 422D and an uplink communications signal 422U via the antenna array 416.

The RF front-end circuit 414 includes a transmit filter circuit 424T, a receive filter circuit 424R, a power management integrated circuit (PMIC) 426, a power amplifier (PA) circuit 428, and a low-noise amplifier (LNA) circuit 430. The transmit filter circuit 424T may be coupled to the interface circuit 420 to receive the downlink communications signal 422D and provide the downlink communications signal 422D to the PA circuit 428. The PA circuit 428 can include a plurality of power amplifiers 432 each configured to amplify the downlink communications signal 422D based on a supply voltage Vcc provided by the PMIC 426.

The antenna array 416 can include a plurality of antenna elements 434 (e.g., 64 antenna elements). Each of the antenna elements 434 is coupled to a respective one of the power amplifiers 323 to receive a respective version (e.g., with proper weight factor and phase offset) of the downlink communications signal 422D. Collectively, the antenna elements 434 can form one or more RF beams 436 to radiate the downlink communications signal 422D to end users. Notably, only the main lobe in each of the RF beams 436 is illustrated herein. The widest spectral spread of the main lobe is referred to as a beamwidth $W_{BM}$ hereinafter.

The LNA circuit 430 includes a plurality of LNAs 438 configured to amplify the uplink communications signal 422U absorbed by the antenna array 416. The LNA circuit 430 is coupled to the receive filter circuit 424R, which provides the uplink communications signal 422U to the interface circuit 420.

Notably, the wireless communications device 400 as illustrated herein only includes a subset of all the circuitries and/or components that are required to make the wireless communications device 400 fully functional. As such, it should be appreciated that the embodiments discussed hereinafter with respect to enabling intelligent thermal and power management are not limited by any specific configuration and/or circuitry layout inside the wireless communications device 400.

In a specific, non-limiting example, the sensor circuits 402(1)-402(6) are each configured to generate the sensor reading signal 404 that indicates a temperature measurement $S_{MEA}$ performed by the respective one of the sensor circuits 402(1)-402(6). In this regard, the control circuit 406 is configured to determine that the temperature measurement $S_{MEA}$ is above at least one of a plurality of abnormal temperature thresholds $TH_H$ corresponding to the respective one of the sensor circuits 402(1)-402(6). Accordingly, the control circuit 406 can perform the one or more of the corrective actions predetermined for the respective one of the sensor circuits 402(1)-402(6) to reduce the temperature measurement $S_{MEA}$ to a desired one of a plurality of tolerable temperature thresholds $TH_L$ corresponding to the respective one of the sensor circuits 402(1)-402(6).

In a non-limiting example, the sensor circuits 402(1), 402(2) are disposed in selected locations inside a housing, but outside the transceiver circuit 412, the RF front-end circuit 414, and the antenna array 416, of the wireless communications device 400 to measure ambient temperature (a.k.a. environmental temperature). In this regard, the sensor circuits 402(1), 402(2) each generates the sensor reading signal 404 that indicates an ambient temperature measurement $S_{MEA}$ performed by the sensor circuit 402(1) or 402(2). Accordingly, the control circuit 406 is configured to perform one or more of the corrective actions predetermined for the respective one of the sensor circuits 402(1), 402(2) to reduce the ambient temperature measurement $S_{MEA}$ to the desired one of the tolerable temperature thresholds $TH_L$ corresponding to the respective one of the sensor circuits 402(1), 402(2).

In contrast, the sensor circuit 402(3) is disposed in proximity to the CPU 418 to perform an internal temperature measurement $S_{MEA}$ of the CPU 418, the sensor circuit 402(4) is disposed in proximity to the interface circuit 420 to perform an internal temperature measurement $S_{MEA}$ of the interface circuit 420, the sensor circuit 402(5) is disposed in proximity to the PA circuit 428 to perform an internal temperature measurement $S_{MEA}$ of the PA circuit 428, and the sensor circuit 402(6) is disposed inside the antenna array 416 to perform an internal temperature measurement $S_{MEA}$ of the antenna array 416. As such, each of the sensor circuits 402(3)-402(6) generates the sensor reading signal 404 that indicates the internal temperature measurement $S_{MEA}$ performed by the respective one of the sensor circuits 402(3)-402(6). Accordingly, the control circuit 406 performs one or more of the corrective actions predetermined for the respective one of the sensor circuits 402(3)-402(6) to reduce the internal temperature measurement $S_{MEA}$ to the desired one of the tolerable temperature thresholds $TH_L$ corresponding to the respective one of the sensor circuits 402(3)-402(6).

The control circuit 406 may perform the corrective actions to reduce the ambient temperature measurements $S_{MEA}$ performed by the sensor circuits 402(1), 402(2) and/or the internal temperature measurements $S_{MEA}$ performed by the sensor circuits 402(3)-402(6) based on a configuration table 440, which may be prestored in the storage circuit 410. In this regard, FIG. 6 provides an exemplary illustration of the configuration table 440 that may be employed by the control circuit 406 in the wireless communications device 400 of FIG. 4 to help enable intelligent thermal and power management.

In a non-limiting example, the configuration table 440 includes columns 600, 602, 604, 606, and 608. The column 600 indicates a respective sensor location of the sensor circuits 402(1)-402(6). For example, the sensor circuit 402(3) is located at the CPU 418 and the sensor circuit 402(5) is located at the PA circuit 428. The column 602 defines the abnormal temperature thresholds $TH_H$ corresponding to each of the sensor circuits 402(1)-402(6). The column 604 defines the tolerable temperature thresholds $TH_L$ corresponding to each of the sensor circuits 402(1)-402(6).

The column 606 defines a plurality of pre-ranked severity levels SL for each of the sensor circuits 402(1)-402(6). In a non-limiting example, the pre-ranked severity levels SL include a minor severity level, a major severity level, a critical severity level, and a catastrophic severity level. The catastrophic severity level is a highest-ranked severity level, the critical severity level is ranked lower than the catastrophic severity level, the major severity level is ranked lower than the critical severity level, and the minor severity level is ranked lower than the major severity level.

The column 608 defines the corrective actions each corresponding to a respective one of the severity levels SL for each of the sensor circuits 402(1)-402(6). The corrective actions as defined in the column 608 may be categorized into a plurality of predefined corrective schemes, namely a beamwidth adaptation scheme, a throughput reduction scheme, a power reduction scheme, a functionality reduction scheme, and an extreme scheme. Notably, the predefined corrective schemes discussed herein are merely examples and shall not be considered as being exclusive.

Figure 7A:
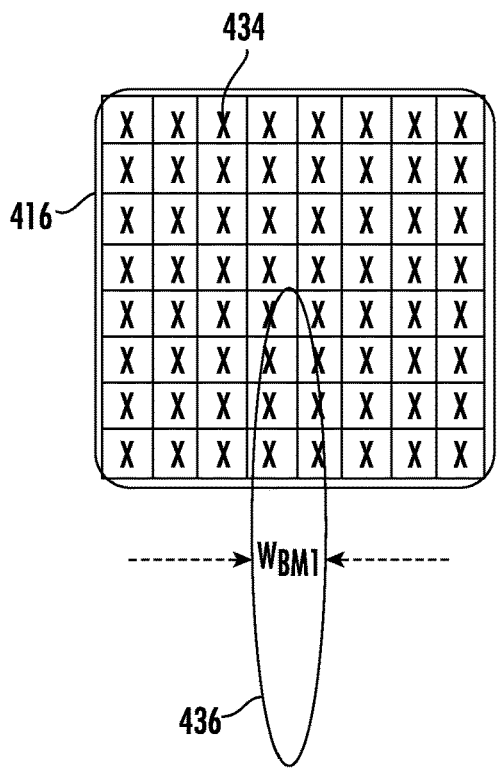
FIGS. 7A-7C are schematic diagrams providing exemplary illustrations of a beamwidth adaptation scheme that can be utilized to enable intelligent thermal and power management in the wireless communications device of FIG. 4.
Figure 7B:
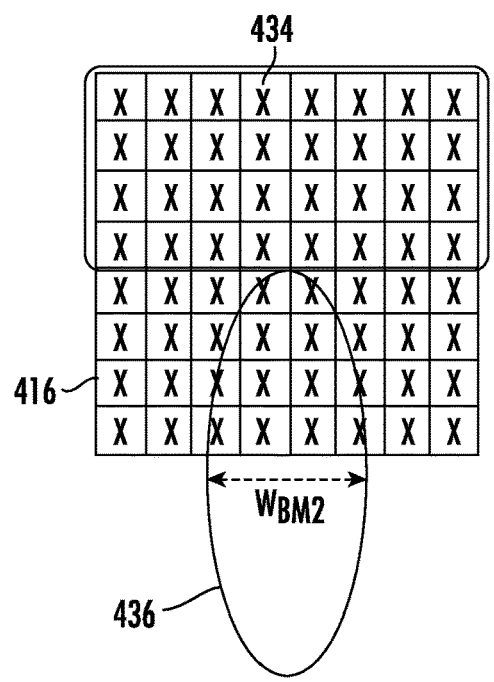
Figure 7C:
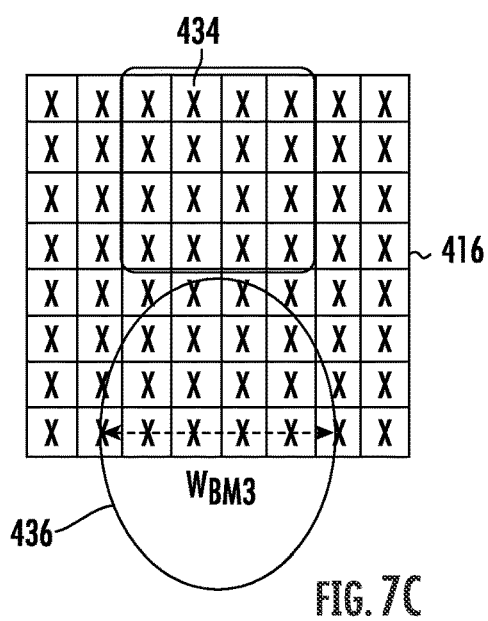

The beamwidth adaptation scheme allows the control circuit 406 to deactivate a selected number of the antenna elements 434 to thereby widen the beamwidth $W_{BM}$ of the RF beam 436 formed by the antenna array 416. In this regard, FIGS. 7A-7C are schematic diagrams providing exemplary illustrations of the beamwidth adaptation scheme that can be utilized to enable intelligent thermal and power management in the wireless communications device 400 of FIG. 4. Common elements between FIGS. 4 and 7A-7C are shown therein with common element numbers and will not be re-described herein.

With reference to FIG. 7A, the antenna array 416 is configured to radiate the RF beam 436 with all of the antenna elements 434 (e.g., 64 antenna elements). In this regard, all of the power amplifiers 432 in the PA circuit 428 are activated to amplify the downlink communications signal 422D. Accordingly, the antenna array 416 radiates the RF beam 436 with a narrower beamwidth $W_{BM1}$.

With the beamwidth adaptation scheme, the control circuit 406 can dynamically deactivate a selected number of antenna elements 434 to help reduce power consumption and thereby improve heat dissipation in the PA circuit 428 and the antenna array 416. As shown in FIG. 7B, the control circuit 406 deactivates half of the antenna elements 434 (e.g., 32 antenna elements) and half of the power amplifiers 432 (e.g., 32 power amplifiers) in the PA circuit 428 (not shown). As such, it may be possible to reduce the power consumption by half to thereby improve heat dissipation in the PA circuit 428 and the antenna array 416. Notably, by deactivating half of the antenna elements 434, the RF beam 436 will be radiated with a broader beamwidth $W_{BM2}$ ($W_{BM2} > W_{BM1}$), which may represent a trade-off between power consumption and coverage range.

In FIG. 7C, the control circuit 406 deactivates three-quarters of the antenna elements 434 (e.g., 48 antenna elements) and three-quarters of the power amplifiers 432 (e.g., 48 power amplifiers) in the PA circuit 428 (not shown) to help further reduce power consumption to thereby further improve heat dissipation in the PA circuit 428 and the antenna array 416. As a result, the antenna array 416 will radiate the RF beam 436 with a further broadened beamwidth $W_{BM3}$ ($W_{BM3} > W_{BM2}$), which may further reduce the coverage range of the RF beam 436.

With reference back to FIG. 6, the throughput reduction scheme allows the control circuit 406 to make a calculated trade-off between thermal control and data throughput. In this regard, FIGS. 7D-7F are schematic diagrams providing exemplary illustrations of the throughput reduction scheme that can be utilized to enable intelligent thermal and power management in the wireless communications device of FIG. 4.

With the throughput reduction scheme, the control circuit 406 can control the transceiver circuit 412 to dynamically blank out a selected number of TDD slots in one or more downlink SFs and/or one or more downlink parts of a special SF (DwPTS) based on 3GPP TDD downlink/uplink configurations (e.g., the TDD FS2 downlink/uplink configurations illustrated in FIG. 2B). Herein, a TDD slot is said to be blanked out if the TDD slot is not allocated to any user for downlink data transmission in the physical downlink shared channel (PDSCH). In a non-limiting example, the transceiver circuit 412 can indicate the TDD slots that are blanked out via the downlink control information (DCI) transmitted in the physical downlink control channel (PDCCH).

Figure 7D:
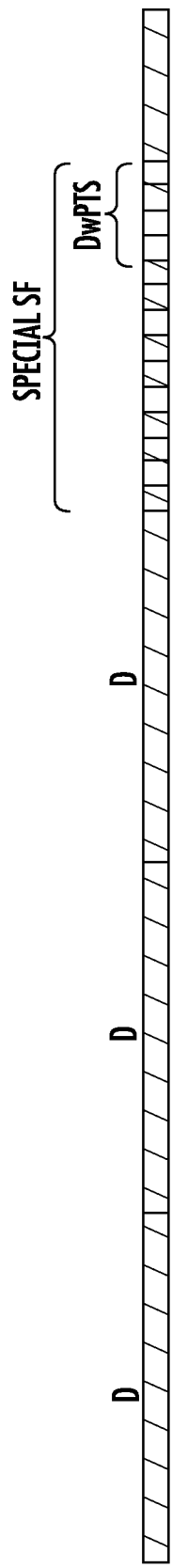
FIGS. 7D-7F are schematic diagrams providing exemplary illustrations of a throughput reduction scheme that can be utilized to enable intelligent thermal and power management in the wireless communications device of FIG. 4.
Figure 7E:
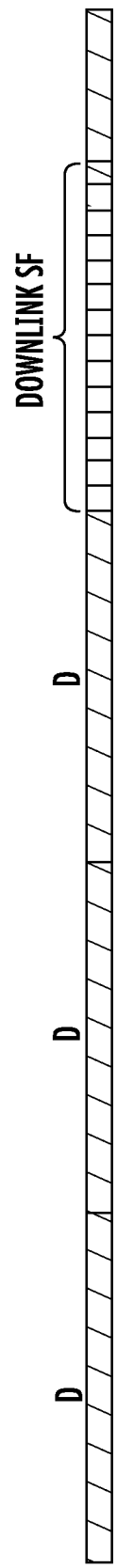
Figure 7F:
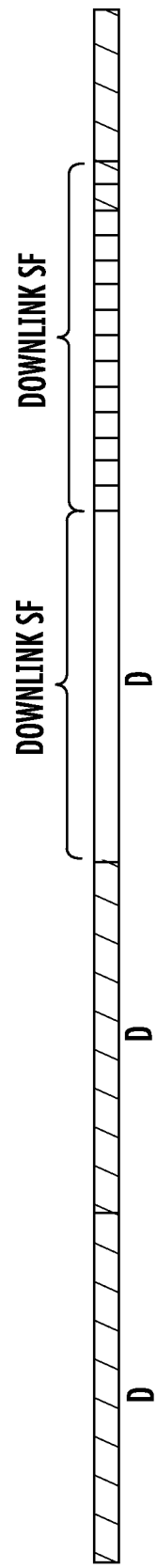

As shown in FIG. 7D, the transceiver circuit 412 blanks out two of four DwPTS slots in a special SF. As shown in FIG. 7E, the transceiver circuit 412 blanks out twelve of fourteen downlink slots in a downlink SF. As shown in FIG. 7F, the transceiver circuit 412 banks out all fourteen downlink slots in a first downlink SF and twelve of fourteen downlink slots in a second downlink SF immediately succeeding the first downlink SF.

With reference back to FIG. 6, with the power reduction scheme, the control circuit 406 is able to reduce output power of one of more of the power amplifiers 432 (e.g., from 23 dBm to 20 dBm) to help reduce power consumption to thereby improve heat dissipation. The functionality reduction scheme allows the control circuit 406 to scale down the functionality of the transceiver circuit 412 in a number of ways. In one example, the control circuit 406 can cause the CPU 418 to operate at a reduced clock rate and/or to turn off some CPU cores if the CPU 418 is a multi-core CPU. Alternatively or concurrently, the control circuit 406 can cause the transceiver circuit 412 to reduce a number of PRBs (e.g., the RBs 202 in the OFDM time-frequency grid 200 of FIG. 2A) available for user allocation, reduce a number of component carriers (e.g., subcarriers 208(1)-208(M) in FIG. 2A), and/or reduce a number of users that are in the radio resource control (RRC) Connected state. The control circuit 406 may force the wireless communications device 400 to shut down or reboot under the extreme scheme to help avert physical damage to the wireless communications device 400.

As shown in the configuration table 440, each of the sensor circuits 402(1)-402(6) can be configured to correspond to a respective set of abnormal temperature thresholds $TH_H$, a respective set of tolerable temperature thresholds $TH_L$, and a respective set of corrective actions.

In one example, for the sensor circuit 402(3) disposed near the CPU 418, the abnormal temperature thresholds $TH_H$ ranges from 70° C. to 100° C. and the tolerable temperature thresholds $TH_L$ ranges from 60° C. to 90° C. The corrective actions include "reduce throughput (throughput reduction scheme)," "reduce radio resource allocation (functionality reduction scheme)," "reduce number of antenna elements (beamwidth adaptation scheme)," and "reboot/shutdown (extreme scheme)."

In another example, for the sensor circuit 402(5) disposed in the PA circuit 428, the abnormal temperature thresholds $TH_H$ ranges from 80° C. to 110° C. and the tolerable temperature thresholds $TH_L$ ranges from 70° C. to 100° C. The corrective actions include "reduce Tx power (power reduction scheme)," "reduce number of antenna elements (beamwidth adaptation scheme)," "further reduce number of antenna elements (beamwidth adaptation scheme)," and "reboot/shutdown (extreme scheme)."

In this regard, the configuration table 440 allows the control circuit 406 to customize corrective actions for each of the sensor circuits 402(1)-402(6) based on different abnormal/tolerable temperature thresholds, thus making it possible to achieve a desirable thermal management result in the wireless communications device 400. In addition, the configuration table 440 also allows the control circuit 406 to customize abnormal/tolerable thresholds and corresponding corrective actions for a variety of other sensor circuits, namely but not limited to power sensor circuit, humidity sensor circuit, and pressure sensor circuit. As such, the control circuit 406 can further support the power, humidity, and/or pressure management in the wireless communications device 400 based on the configuration table 440.

In a non-limiting example, the control circuit 406 can be further configured to determine, based on the temperature measurement $S_{MEA}$, a selected severity level among the pre-ranked severity levels SL. As shown in the configuration table 440, each of the pre-ranked severity levels SL corresponds to a respective one of the abnormal temperature thresholds $TH_H$, a respective one of the tolerable temperature thresholds $TH_L$, and a respective one of the corrective actions. For example, the "minor" severity level for the sensor circuit 402(3) corresponds to the abnormal temperature threshold $TH_H$ of 70° C., the tolerable temperature threshold $TH_L$ of 60° C., and the corrective action of "reduce throughput." The "critical" severity level for the sensor circuit 402(3) corresponds to the abnormal temperature threshold $TH_H$ of 90° C., the tolerable temperature threshold $TH_L$ of 80° C., and the corrective action of "reduce number of antenna elements."

Upon determining the severity level for the temperature measurement $S_{MEA}$, the control circuit 406 may perform the respective one of the corrective actions to reduce the temperature measurement $S_{MEA}$ to the respective one of the tolerable temperature thresholds $TH_L$ corresponding to the selected severity level. For example, if the temperature measurement $S_{MEA}$ from the sensor circuit 402(3) is above 90° C. but lower than 100° C., the control circuit 406 would determine that the temperature measurement $S_{MEA}$ falls on the "critical" severity level. Accordingly, the control circuit 406 can perform the corresponding corrective action corresponding to the "critical" severity level to reduce the number of antenna elements to thereby reduce the temperature measurement $S_{MEA}$ to the tolerable temperature threshold $TH_L$ of 80° C.

In one embodiment, the control circuit 406 may stop performing any more of the corrective actions when the temperature measurement $S_{MEA}$ is reduced to the desired one of the tolerable temperature thresholds SL. In this regard, the control circuit 406 can stop performing any further corrective action when the temperature measurements $S_{MEA}$ is reduced to the tolerable temperature threshold $TH_L$ of 80° C.

In an alternative embodiment, after reducing the temperature measurement $S_{MEA}$ to the tolerable temperature threshold $TH_L$ of 80° C., the control circuit 406 may determine that the temperature measurement $S_{MEA}$ is above the respective one of the abnormal temperature thresholds $TH_H$ of a lower-ranked severity level among the pre-ranked severity levels SL. For example, the control circuit 406 can determine that the temperature measurement $S_{MEA}$ of 80° C. is still higher than the tolerable temperature threshold $TH_L$ associated with the "major" and the "minor" severity levels. In this regard, the control circuit 406 may perform the respective one of the corrective actions corresponding to the "major" and/or the "minor" severity level to reduce the temperature measurement $S_{MEA}$ to the respective one of the tolerable temperature thresholds $TH_L$ corresponding to the "major" severity level (70° C.) and/or the "minor" severity level (60° C.).

In another embodiment, it is also possible to define multiple corrective actions in the column 608 for each of the severity levels SL associated with each of the sensor circuits 402(1)-402(6). In this regard, the control circuit 406 may perform the multiple corrective actions, either concurrently or sequentially, for each of the severity levels SL associated with each of the sensor circuits 402(1)-402(6).

Figure 8:
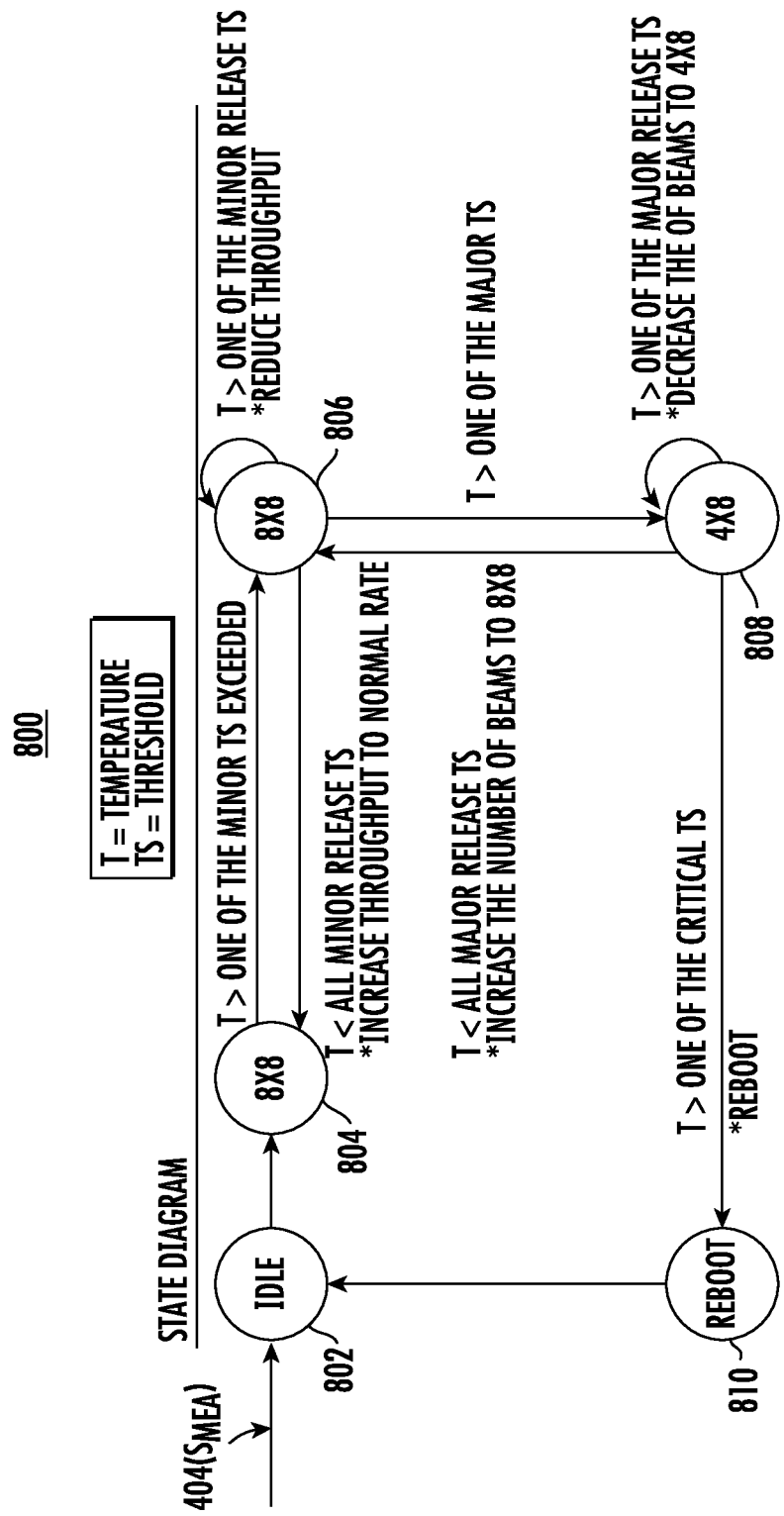
FIG. 8 is a flow diagram of an exemplary state machine that can be employed by a control circuit in the wireless communications device of FIG. 4 to enable intelligent thermal and power management.

The control circuit 406 may support thermal management as described above based on a state machine. In this regard, FIG. 8 is a flow diagram of an exemplary state machine 800 that can be employed by the control circuit 406 in the wireless communications device 400 of FIG. 4 to enable intelligent thermal and power management.

The control circuit 406 may await the sensor reading signal 404 indicating the temperature measurement $S_{MEA}$ performed by any of the sensor circuits 402(1)-402(6) in FIG. 4 at an Idle state 802. The control circuit 406 performs no action in the Idle state 802.

In response to receiving the sensor reading signal 404, the control circuit 406 enters state 804, wherein all of the antenna elements 434 in the antenna array 416 are active (e.g., as shown in FIG. 7A). The control circuit 406 may determine that the temperature measurement $S_{MEA}$ is above the abnormal temperature threshold $TH_H$ associated with the "minor" severity level. Accordingly, the control circuit 406 enters state 806.

At state 806, the control circuit 406 starts to reduce throughput in accordance with the throughput reduction scheme as described above. In the meantime, the control circuit 406 keeps checking whether the temperature measurement $S_{MEA}$ is reduced to the tolerable temperature threshold $TH_L$ of the "minor" severity level. The control circuit 406 may return to state 804 if the temperature measurement $S_{MEA}$ is reduced to the tolerable temperature threshold $TH_L$ of the "minor" severity level. Otherwise, the control circuit 406 will remain in state 806 to continue monitoring the temperature measurement $S_{MEA}$.

In case the temperature measurement $S_{MEA}$ continues to rise to the "major" severity level, the control circuit 406 enters state 808 in response. Herein, the control circuit 406 will deactivate one-half of the antenna elements 434 in the antenna array 416 (e.g., as shown in FIG. 7B) in accordance with the beamwidth adaptation scheme as described above. Notably, the control circuit 406 may perform the beamwidth adaptation scheme with or without stopping the throughput reduction scheme that has been performed in state 806. In the meantime, the control circuit 406 keeps checking whether the temperature measurement $S_{MEA}$ is reduced to the tolerable temperature threshold $TH_L$ of the "major" severity level. The control circuit 406 may return to state 806 if the temperature measurement $S_{MEA}$ is reduced to the tolerable temperature threshold $TH_L$ of the "major" severity level. Otherwise, the control circuit 406 will remain in state 806 to continue monitoring the temperature measurement $S_{MEA}$.

Should the temperature measurement $S_{MEA}$ continue to rise to above the abnormal temperature threshold $TH_H$ of the "catastrophic" severity level, the control circuit 406 will proceed to state 810. Herein, the control circuit 406 will shut down or reboot the wireless communications device 400 in accordance with the "extreme" scheme. The control circuit 406 may return to the Idle state 802 upon rebooting the wireless communications device 400.

Figure 9:
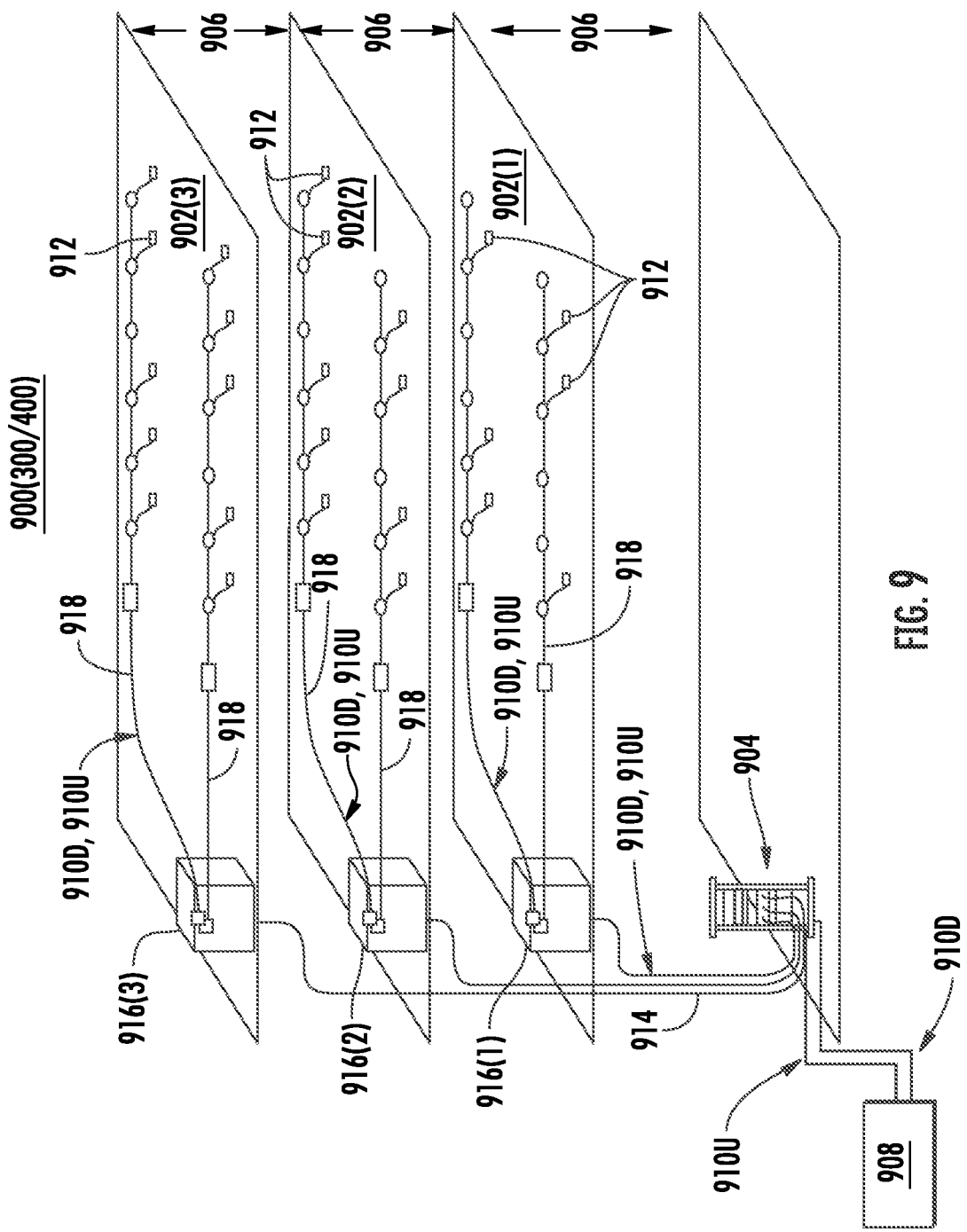
FIG. 9 is a partial schematic cut-away diagram of an exemplary building infrastructure in a WCS, such as the WCS of FIG. 3 that includes the wireless communications device of FIG. 4.

The WCS 300 of FIG. 3, which can include the wireless communications device 400 in FIG. 4, can be provided in an indoor environment as illustrated in FIG. 9. FIG. 9 is a partial schematic cut-away diagram of an exemplary building infrastructure 900 in a WCS, such as the WCS 300 of FIG. 3 that includes the wireless communications device 400 of FIG. 4. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
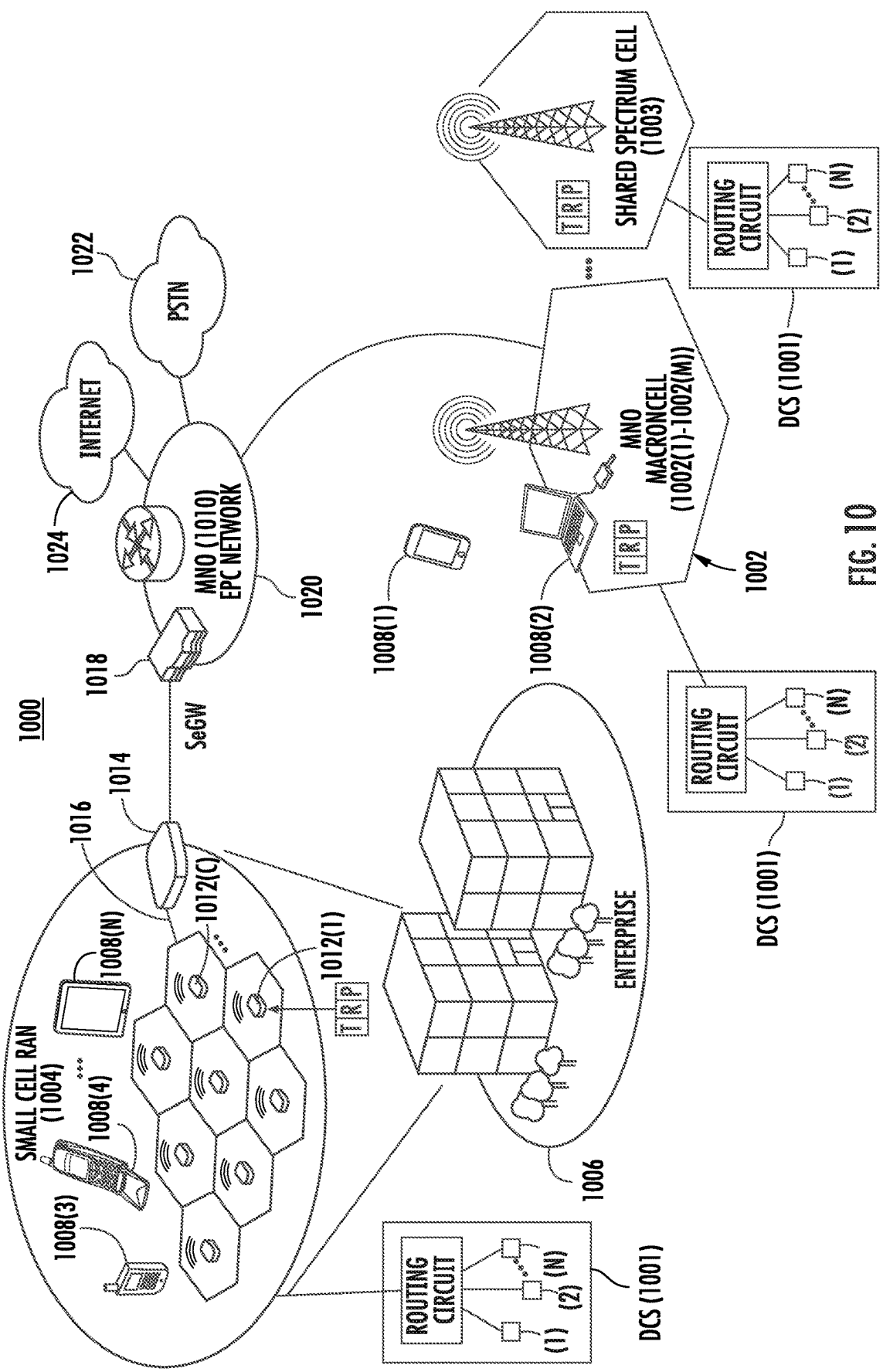
FIG. 10 is a schematic diagram of an exemplary mobile telecommunications environment that can includes the WCS of FIG. 3 that includes the wireless communications device of FIG. 4 for enabling intelligent thermal and power management.

The WCS 300 of FIG. 3 and the wireless communications device 400 of FIG. 4 configured to enable intelligent thermal and power management can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum WCSs 1001 supporting coordination of distribution of shared spectrum from multiple service providers to remote units to be distributed to subscriber devices. The shared spectrum WCSs 1001 can include the WCS 300 of FIG. 3 that includes the wireless communications device 400 of FIG. 4, as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between a user mobile communications device 1008(1)-1008(N) to a mobile network operator (MNO) 1010. A serving RAN for the user mobile communications devices 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas the user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO, such as CBRS for example, and thus may service user mobile communications devices 1008(1)-1008(N) independent of a particular MNO. For example, the shared spectrum cell 1003 may be operated by a third party that is not an MNO and wherein the shared spectrum cell 1003 supports CBRS. Also, as shown in FIG. 10, the MNO macrocell 1002, the shared spectrum cell 1003, and/or the small cell RAN 1004 can interface with a shared spectrum WCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that a user mobile communications device 1008(3)-1008(N) may be able to be in communications range of two or more of the MNO macrocell 1002, the shared spectrum cell 1003, and the small cell RAN 1004 depending on the location of the user mobile communications devices 1008(3)-1008(N).

In FIG. 10, the mobile telecommunications environment 1000 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g, evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g., EPC network in a 4G network, or 5G Core in a 5G network) through either a macrocell 1002 or small cell radio node 1012(1)-1012(C) in the small cell RAN 1004 in the environment 1000.

Figure 11:
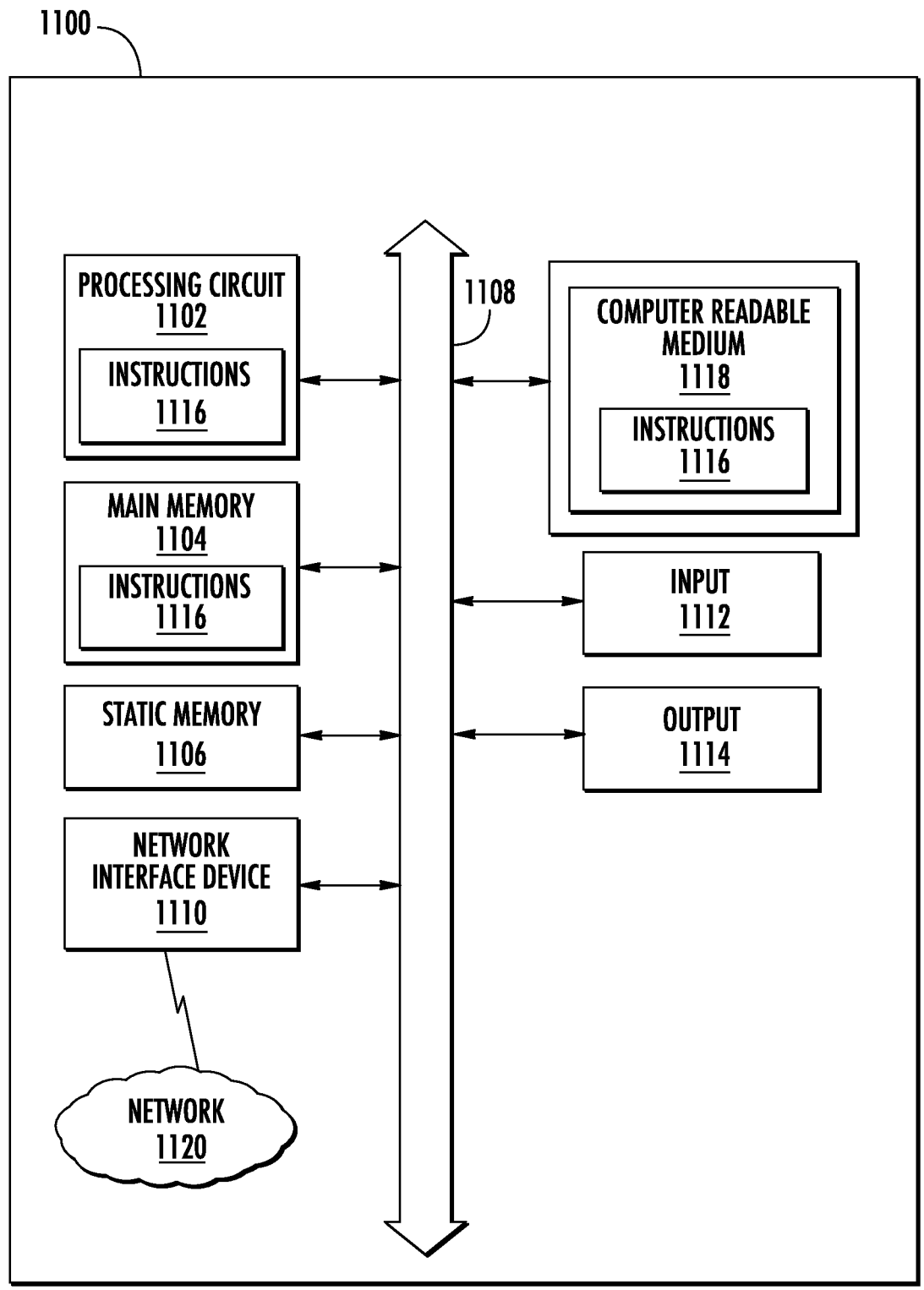
FIG. 11 is a schematic diagram of a representation of an exemplary computer system that can be included in or interfaced with any of the components in the WCS of FIG. 3 and the wireless communications device in FIG. 4 for enabling intelligent thermal and power management, wherein the exemplary computer system is configured to execute instructions from an exemplary computer-readable medium.

Any of the circuits in the WCS 300 of FIG. 3 and the wireless communications device 400 of FIG. 4, such as the control circuit 406, can include a computer system 1100, such as that shown in FIG. 11, to carry out their functions and operations. With reference to FIG. 11, the computer system 1100 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1100 in this embodiment includes a processing circuit or processor 1102, a main memory 1104 (e.g., read-only memory (ROM), flash memory, dynamic random access memory (DRAM) such as synchronous DRAM (SDRAM), etc.), and a static memory 1106 (e.g., flash memory, static random access memory (SRAM), etc.), which may communicate with each other via a data bus 1108. Alternatively, the processing circuit 1102 may be connected to the main memory 1104 and/or static memory 1106 directly or via some other connectivity means. The processing circuit 1102 may be a controller, and the main memory 1104 or static memory 1106 may be any type of memory.

The processing circuit 1102 represents one or more general-purpose processing circuits such as a microprocessor, central processing unit, or the like. More particularly, the processing circuit 1102 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1102 is configured to execute processing logic in instructions 1116 for performing the operations and steps discussed herein.

The computer system 1100 may further include a network interface device 1110. The computer system 1100 also may or may not include an input 1112 to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processing circuit 1102 during execution thereof by the computer system 1100, the main memory 1104 and the processing circuit 1102 also constituting the computer-readable medium 1118. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer—readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless communications device, comprising:
   a plurality of sensor circuits each configured to generate a sensor reading signal that indicates a sensory measurement performed by the sensor circuit; and
   a control circuit configured to:
      receive the sensor reading signal generated from a respective one of the plurality of sensor circuits;
      determine if the sensory measurement indicated by the sensor reading signal is above at least one of a plurality of abnormal thresholds corresponding to the respective one of the plurality of sensor circuits;
      in response to the sensory measurement indicated by the sensor reading signal being above the at least one of the plurality of abnormal thresholds, perform one or more of a plurality of corrective actions predetermined for the respective one of the plurality of sensor circuits to reduce the sensory measurement to a desired one of a plurality of tolerable thresholds corresponding to the respective one of the plurality of sensor circuits,
      receive the sensor reading signal from the respective one of the plurality of sensor circuits that indicates a temperature measurement performed by the respective one of the plurality of sensor circuits;
      determine that the temperature measurement is above at least one of a plurality of abnormal temperature thresholds corresponding to the respective one of the plurality of sensor circuits; and
      perform the one or more of the plurality of corrective actions predetermined for the respective one of the plurality of sensor circuits to reduce the temperature measurement to a desired one of a plurality of tolerable temperature thresholds corresponding to the respective one of the plurality of sensor circuits;
   a transceiver circuit comprising:
      a central processing unit (CPU); and
      an interface circuit;
   a radio frequency (RF) front-end circuit comprising:
      a transmit filter circuit and a receive filter circuit each coupled to the transceiver circuit;
      a power amplifier (PA) circuit coupled to the transmit filter circuit and comprising a plurality of PAs;
      a power management integrated circuit (PMIC) coupled to the PA circuit; and
      a low-noise amplifier (LNA) circuit coupled to the receive filter circuit and comprising a plurality of LNAs; and
   an antenna array comprising a plurality of antenna elements each coupled to a respective one of the plurality of PAs and a respective one of the plurality of LNAs.

2. The wireless communications device of claim 1, wherein the control circuit is further configured to:
   determine, based on the temperature measurement, a selected severity level among a plurality of pre-ranked severity levels each corresponding to a respective one of the plurality of abnormal temperature thresholds, a respective one of the plurality of tolerable temperature thresholds, and a respective one of the plurality of corrective actions; and
   perform the respective one of the plurality of corrective actions to reduce the temperature measurement to the respective one of the plurality of tolerable temperature thresholds corresponding to the selected severity level.

3. The wireless communications device of claim 2, wherein the plurality of pre-ranked severity levels comprises a minor severity level, a major severity level, a critical severity level, and a catastrophic severity level, wherein the catastrophic severity level is a highest-ranked severity level, the critical severity level is ranked lower than the catastrophic severity level, the major severity level is ranked lower than the critical severity level, and the minor severity level is ranked lower than the major severity level.

4. The wireless communications device of claim 2, wherein the control circuit is further configured to:
   determine that the temperature measurement is above the respective one of the plurality of tolerable temperature thresholds of a lower-ranked severity level among the plurality of pre-ranked severity levels; and
   perform the respective one of the plurality of corrective actions to reduce the temperature measurement to the respective one of the plurality of tolerable temperature thresholds corresponding to the lower-ranked severity level.

5. The wireless communications device of claim 1, wherein the control circuit is further configured to stop performing the one or more of the plurality of corrective actions when the temperature measurement is reduced to the desired one of the plurality of tolerable temperature thresholds.

6. The wireless communications device of claim 1, wherein:
   the respective one of the plurality of sensor circuits is disposed outside the transceiver circuit, the RF front-end circuit, and the antenna array to perform an ambient temperature measurement; and
   the control circuit is further configured to perform the one or more of the plurality of corrective actions predetermined for the respective one of the plurality of sensor circuits to reduce the ambient temperature measurement to the desired one of the plurality of tolerable temperature thresholds corresponding to the respective one of the plurality of sensor circuits.

7. The wireless communications device of claim 1, wherein:
   the respective one of the plurality of sensor circuits is disposed in one or more of the transceiver circuit, the RF front-end circuit, and the antenna array to perform an internal temperature measurement; and
   the control circuit is further configured to perform the one or more of the plurality of corrective actions predetermined for the respective one of the plurality of sensor circuits to reduce the internal temperature measurement to the desired one of the plurality of tolerable temperature thresholds corresponding to the respective one of the plurality of sensor circuits.

8. The wireless communications device of claim 1, wherein the control circuit is further configured to perform the one or more of the plurality of corrective actions based on a plurality of predefined corrective schemes, the plurality of predefined corrective schemes comprising:
   a beamwidth adaptation scheme wherein the control circuit is further configured to deactivate a selected number of the plurality of antenna elements to thereby widen a beamwidth of an RF beam formed by the antenna array;
   a throughput reduction scheme wherein the control circuit is further configured to control the transceiver circuit to blank out a selected number of time-division duplex (TDD) slots in one or more downlink subframes and/or one or more downlink parts of a special subframe;
   a power reduction scheme wherein the control circuit is further configured to reduce output power of one or more of the plurality of PAs;
   a functionality reduction scheme wherein the control circuit is further configured to control the transceiver circuit to perform one or more of following actions:
      reducing a number of physical resource blocks (PRBs) available for user allocation;
      reducing a number of component carriers available for user allocation;
      reducing a number of users in radio resource control (RRC) Connected state; and
   an extreme scheme wherein the control circuit is further configured to control the CPU to shut down or reboot the wireless communications device.

9. A method for supporting intelligent thermal and power management in a wireless communications device in a wireless communications system (WCS), comprising:
   receiving a sensor reading signal generated from a respective one of a plurality of sensor circuits, wherein the sensor reading signal indicates a sensory measurement performed by the respective one of the plurality of sensor circuits;
   determining if the sensory measurement indicated by the sensor reading signal is above at least one of a plurality of abnormal thresholds corresponding to the respective one of the plurality of sensor circuits;
   in response to the sensory measurement indicated by the sensor reading signal being above the at least one of the plurality of abnormal thresholds, performing one or more of a plurality of corrective actions predetermined for the respective one of the plurality of sensor circuits to reduce the sensory measurement to a desired one of a plurality of tolerable thresholds corresponding to the respective one of the plurality of sensor circuits;
   receiving the sensor reading signal from the respective one of the plurality of sensor circuits that indicates a temperature measurement performed by the respective one of the plurality of sensor circuits;
   determining that the temperature measurement is above at least one of a plurality of abnormal temperature thresholds corresponding to the respective one of the plurality of sensor circuits;
   performing the one or more of the plurality of corrective actions predetermined for the respective one of the plurality of sensor circuits to reduce the temperature measurement to a desired one of a plurality of tolerable temperature thresholds corresponding to the respective one of the plurality of sensor circuits;
   determining, based on the temperature measurement, a selected severity level among a plurality of pre-ranked severity levels each corresponding to a respective one of the plurality of abnormal temperature thresholds, a respective one of the plurality of tolerable temperature thresholds, and a respective one of the plurality of corrective actions; and
   performing the respective one of the plurality of corrective actions to reduce the temperature measurement to the respective one of the plurality of tolerable temperature thresholds corresponding to the selected severity level.

10. The method of claim 9, wherein the plurality of pre-ranked severity levels comprises a minor severity level, a major severity level, a critical severity level, and a catastrophic severity level, wherein the catastrophic severity level is a highest-ranked severity level, the critical severity level is ranked lower than the catastrophic severity level, the major severity level is ranked lower than the critical severity level, and the minor severity level is ranked lower than the major severity level.

11. The method of claim 9, further comprising:
   determining that the temperature measurement is above the respective one of the plurality of tolerable temperature thresholds of a lower-ranked severity level among the plurality of pre-ranked severity levels; and
   performing the respective one of the plurality of corrective actions to reduce the temperature measurement to the respective one of the plurality of tolerable temperature thresholds corresponding to the lower-ranked severity level.

12. The method of claim 9, further comprising stopping performing the one or more of the plurality of corrective actions when the temperature measurement is reduced to the desired one of the plurality of tolerable temperature thresholds.

13. The method of claim 9, further comprising:
   disposing the respective one of the plurality of sensor circuits outside one or more circuits in the wireless communications device to perform an ambient temperature measurement; and
   performing the one or more of the plurality of corrective actions predetermined for the respective one of the plurality of sensor circuits to reduce the ambient temperature measurement to the desired one of the plurality of tolerable temperature thresholds corresponding to the respective one of the plurality of sensor circuits.

14. The method of claim 9, further comprising:
   disposing the respective one of the plurality of sensor circuits inside one or more circuits in the wireless communications device to perform an internal temperature measurement; and
   performing the one or more of the plurality of corrective actions predetermined for the respective one of the plurality of sensor circuits to reduce the internal temperature measurement to the desired one of the plurality of tolerable temperature thresholds corresponding to the respective one of the plurality of sensor circuits.

15. The method of claim 9, further comprising performing the one or more of the plurality of corrective actions based on one or more of a beamwidth adaptation scheme, a throughput reduction scheme, a power reduction scheme, a functionality reduction scheme, and an extreme scheme.

16. A wireless communications system (WCS), comprising:
   a wireless communications device coupled to a centralized services node and comprising:
      a plurality of sensor circuits each configured to generate a sensor reading signal that indicates a sensory measurement performed by the sensor circuit; and
      a control circuit configured to:
         receive the sensor reading signal generated from a respective one of the plurality of sensor circuits;
         determine if the sensory measurement indicated by the sensor reading signal is above at least one of a plurality of abnormal thresholds corresponding to the respective one of the plurality of sensor circuits; and
         in response to the sensory measurement indicated by the sensor reading signal being above the at least one of the plurality of abnormal thresholds, perform one or more of a plurality of corrective actions predetermined for the respective one of the plurality of sensor circuits to reduce the sensory measurement to a desired one of a plurality of tolerable thresholds corresponding to the respective one of the plurality of sensor circuits;
   a digital routing unit (DRU) coupled to the centralized services node via a baseband unit (BBU); and
   a plurality of remote units each coupled to the DRU via a plurality of optical fiber-based communications mediums, respectively;
   wherein:
      the DRU is configured to:
         receive a downlink communications signal from the centralized services node;
         convert the downlink communications signal into a plurality of downlink communications signals;
         distribute the plurality of downlink communications signals to the plurality of remote units, respectively;
         receive a plurality of uplink communications signals from the plurality of remote units, respectively;
         convert the plurality of uplink communications signals into an uplink communications signal; and
         provide the uplink communications signal to the centralized services node.

17. The WCS of claim 16, wherein the control circuit is further configured to:
   receive the sensor reading signal from the respective one of the plurality of sensor circuits that indicates a temperature measurement performed by the respective one of the plurality of sensor circuits;
   determine that the temperature measurement is above at least one of a plurality of abnormal temperature thresholds corresponding to the respective one of the plurality of sensor circuits; and
   perform the one or more of the plurality of corrective actions predetermined for the respective one of the plurality of sensor circuits to reduce the temperature measurement to a desired one of a plurality of tolerable temperature thresholds corresponding to the respective one of the plurality of sensor circuits.

18. The WCS of claim 16, wherein:
   the DRU comprises:
      an electrical-to-optical (E/O) converter configured to convert the plurality of downlink communications signals into a plurality of downlink optical communications signals, respectively;
      an optical-to-electrical (O/E) converter configured to convert a plurality of uplink optical communications signals into the plurality of uplink communications signals, respectively; and
   the plurality of remote units each comprises:
      a respective O/E converter configured to convert a respective one of the plurality of downlink optical communications signals into a respective one of the plurality of downlink communications signals; and
      a respective E/O converter configured to convert a respective one of the plurality of uplink communications signals into a respective one of the plurality of uplink optical communications signals.

* * * * *